Patented Aug. 25, 1936

2,052,192

UNITED STATES PATENT OFFICE 2,052,192

BORIC ACID ESTERS

Henry Alfred Piggott, Cheadle Hulme, England, assignor to Imperial Chemical Industries Limited, a corporation of Great Britain No Drawing. Application October 23, 1935, Serial No. 46,347

20 Claims. (Cl. 260—98)

This invention relates to new chemical compounds, their methods of preparation, and their uses, and more particularly to new boric acid esters of organic compounds which contain a saturated or unsaturated aliphatic radical having a chain of eight or more carbon atoms connected to another radical which contains a plurality of hydroxy groups.

This case is a continuation in part of copending application, Serial Number 708,333, filed January 25, 1934.

This invention has as an object the preparation of new chemical compounds. A further object is to provide novel and easily conducted processes for preparing technically valuable compounds from relatively cheap starting materials. A still further object is the application of these compounds as detergents, wetting agents, dispersing agents, softening agents, and dissolving agents. Another object is their application in a variety of miscellaneous technical uses. Other objects will appear hereinafter.

These objects are accomplished by the following invention which embraces the preparation of new boric acid esters of organic compounds which contain a saturated or unsaturated aliphatic radical having a chain of eight or more carbon atoms connected through a nitrogen atom to another aliphatic radical which contains a plurality of hydroxy groups.

The following examples in which parts are by weight illustrate but do not limit the invention.

Example 1

A solution of 72 parts of the product from stearic acid and 1-aminopropanediol-2,3 (see below) in 2000 parts of dry xylene is heated to boiling with 38 parts of crystalline boric acid in a distillation apparatus. Much of the boric acid passes into solution and water passes over with the xylene vapor and is found in the receiver. When only one-tenth part of the original xylene is left in the still, the still residue is removed, filtered from a little unchanged boric acid, and the remainder of the xylene distilled off in a vacuum. A white boron-containing solid is left which when treated with triethanolamine forms a useful agent for the preparation of aqueous emulsions of hard waxes, e. g. candelilla wax.

The starting material for this example is made as follows:—A mixture of 130 parts of 1-aminopropanediol-2,3 (prepared by interaction of glycide and ammonia, see Berichte der Deutschen Chem. Ges. 1899, vol. 32, pages 750–757) with 390 parts of stearic acid is heated together with good stirring at 100° C. until the product is completely soluble in water denoting that soap formation is complete. The temperature is then raised to 190° C., and this temperature is maintained until steam is no longer evolved and the product is completely soluble in benzene. On cooling, a white waxy solid, which is soluble in hot water to a solution that sets to a gel when cold and soluble also in the commoner organic solvents such as benzene and alcohol, is obtained. The product thus obtained has the probable formula:

$C_{17}H_{35}CONHCH_2CHOHCH_2OH$

Example 2

The product obtained by heating 284 parts by weight of stearic acid with 200 parts of methyl glucamine at 130–180° C. for 4 hours is ground and 461 parts (1 mol) of this material are warmed and stirred with 3195 parts of water until uniform. A hot solution of 124 parts (2 mols) of boric acid in 500 parts water is stirred in and after fifteen minutes, 320 parts of 25% sodium hydroxide solution are added. A soapy, almost solid product is obtained which possesses very good washing, protective, and thickening properties. The stearyl methyl glucamide used as a starting material in this example probably corresponds to the formula:

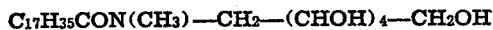

$C_{17}H_{35}CON(CH_3)—CH_2—(CHOH)_4—CH_2OH$ and is made by heating stearic acid with methyl glucamine. The method of preparing this substance is more fully set forth in Example 1 of my U. S. Patent 1,985,424.

Many other amides besides those set forth in the preceding examples may be employed for making the borates of the present invention. For instance, 1-aminopropanediol-2,3 may be reacted with other acids such as lauric, palmitic, and oleic, in order to obtain amides which may profitably be esterified with boric acid according to the processes of the present invention. Instead of preparing these amides from an individual fatty acid, it is feasible to use arbitrary mixtures of these fatty acids or mixtures obtained by hydrolysis of common fats and oils. Such fats and oils as coconut oil, palm oil, tallow, sperm oil, olive oil, and palm kernel oil upon hydrolysis yield mixtures of fatty acids which may be used in place of stearic acid, etc., in preparing suitable amides for use in the processes of the present invention. Illustrations of how mixtures of fatty acids may be converted into amides suitable for use in the present invention are set forth in the next two paragraphs.

A mixture of 130 parts of 1-aminopropanediol-2,3 (prepared by interaction of glycide and ammonia, see Berichte der Deutschen Chem. Ges. 1899, vol. 32, pages 750–757) with 297 parts of the fatty acids from coconut oil is heated together with good stirring at 100° C. until the product is completely soluble in water denoting that soap formation is complete. The temperature is then raised to 190° C. and this temperature is maintained until steam is no longer evolved and the product is completely soluble in benzene. On cooling, a white waxy solid which is soluble in hot water to a viscous foaming solution that sets to a white jelly when cold and soluble also in the commoner organic solvents such as benzene and alcohol, is obtained. This product may be esterified with boric acid in a manner analogous to that disclosed in the examples given above to obtain a new composition which comes within the scope of the present invention.

If the 297 parts of coconut oil fatty acids be replaced by 540 parts of the crude acids obtained by hydrolysis of beeswax and the reaction with 1-aminopropanediol-2,3 be conducted in the manner set forth in the preceding paragraph, a dark brown waxy solid readily soluble in benzene and slightly soluble in hot water to a clear soap-like solution is obtained. This product may also be used for preparing boric acid esters which come within the scope of the present invention.

Instead of using 1-aminopropanediol-2,3 for preparing these amides, use may be made of some of the other amines disclosed in Berichte der Deutschen Chem. Ges. 1899, vol. 32, pages 750-757. For instance, 1-methylaminopropanediol-2,3 or 1-ethylaminopropanediol-2,3 may be reacted with lauric, myristic, palmitic, oleic, elaidic, stearic, or arachidic acid or with fatty acid mixtures obtained by the hydrolysis of coconut oil, palm oil, olive oil, cotton seed oil, sperm oil, peanut oil, or tallow, and the amides thereby obtained be esterified with boric acid in accordance with the processes of the present invention.

Several of the amines disclosed in Berichte der Deutschen Chem. Ges. 1897, vol. 30, pages 2060-2068, may also be used to prepare amides which may be esterified in accordance with the processes of the present invention. Thus, trimethylolmethyl amine of formula $(CH_2OH)_3$—C—$NH_2$; methyl-dimethylol-methyl amine of formula $(CH_2OH)_2(CH_3)$C—$NH_2$; or 2-aminopropanediol-1,3 of formula $(CH_2OH)_2CH$—$NH_2$ may be reacted with the fatty acids or fatty acid mixtures mentioned in the preceding paragraph, and the amides thereby obtained be employed for making some of the boric acid esters which come within the scope of the present invention. Of particular utility for this purpose is the amide prepared by heating together equivalent amounts of stearic acid and trimethylol-methyl amine at 180° C. until evolution of steam ceases. The product thus obtained has the probable formula:

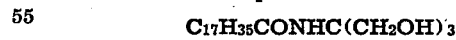
$$C_{17}H_{35}CONHC(CH_2OH)_3$$

Another important group of amides for use in connection with the present invention comprise those obtained by reacting a fatty acid with a primary or secondary sugar amine. The stearyl methyl glucamide of Example 2 is a member of this group of amides. Another member is stearyl glucamide of formula:

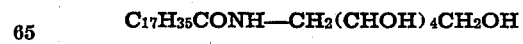
$$C_{17}H_{35}CONH—CH_2(CHOH)_4CH_2OH$$

which is prepared by reacting stearic acid with glucamine. Such sugar amines as glucamine, methyl glucamine, ethyl glucamine, hydroxyethyl glucamine, galactamine, methyl galactamine, methyl fructamine, mannamine, arabinamine, xylamine, methyl xylamine, and butyl xylamine, all of which may be prepared in accordance with the instructions set forth in U. S. Patent 1,994,467, may be reacted with lauric, myristic, palmitic, oleic, stearic, or arachidic acid or with the fatty acid mixtures obtained in the hydrolysis of coconut oil, palm oil, palm kernel oil, olive oil, cotton seed oil, sperm oil, peanut oil, spermaceti or tallow in order to obtain suitable amides from which the boric acid esters of the present invention may be prepared. The amides disclosed in Examples 1, 2, 6, 9, and 11 of my U. S. Patent 1,985,424, are eminently suited for use as starting materials for preparing boric acid esters which come within the scope of the present invention.

In general, it may be seen from the above paragraphs that the present invention includes within its scope the preparation of boric acid esters of compounds having the general formula:

$$R—CO—NY—X$$

in which R stands for a saturated or unsaturated aliphatic radical containing a chain of eight or more carbon atoms, Y represents hydrogen or an alkyl group containing not more than five carbon atoms, and X stands for a polyhydroxylated alkyl group containing from three to six carbon atoms. R usually stands for a saturated aliphatic hydrocarbon radical containing a straight chain of from eleven to nineteen carbon atoms.

While boric acid is generally and preferably used for esterifying these amides, it is also feasible to use boron trioxide for this purpose. It is also contemplated that other solvents besides xylene and water may be used.

Other neutralizing agents besides triethanolamine and sodium hydroxide may be used for preparing suitable salts of the products obtained by esterifying the above mentioned amides with boric acid. For example, sodium bicarbonate, potassium hydroxide, ammonium hydroxide, the methyl amines, di-ethanolamine, diethyl amine, butyl amine, benzyl amine, piperidine, morpholine, etc., may be used for preparing suitable salts of these esterification products. The term "boric acid esters" is used in a generic sense in this specification, and the appended claims to refer to boric acid derivatives of the above mentioned amides irrespective of whether or not the acid hydrogen atom connected to the boron atom has been neutralized.

The new compositions covered in this case belong to the class of surface active or capillary active materials in that they have colloidal properties and may therefore, be advantageously used in any process involving wetting, penetrating, deterging, dispersing, emulsifying, frothing, foaming, and kindred phenomena. These compositions may be employed in pure or standardized form, and if desired, in conjunction with known processing or treating agents. They may be used by themselves or in combination with other surface active agents in any relation in which surface active agents having colloidal properties have heretofore been used.

Many uses of these new compositions are connected with treatments for processing and improving natural and synthetic textile materials. A few representative uses of these new products as textile assistants will be mentioned in order that the importance and widespread applicability of these new products in the textile industries may be fully appreciated. They may be used alone or in combination with other suitable detergents for cleansing and scouring vegetable and animal fibers when removing fatty or oily materials. They may be used as penetrants in acid solutions which are used for carbonizing vegetable matter in wool. When added to flax retting baths, they function as wetting and penetrating agents. They may be employed as assistants in fulling and felting processes. They may be used in sizing preparations in combination with the usual materials such as starches or gelatine or their equivalents, clays, talcs or their equivalents, oils and oils processed by oxidization, polymerization, sulfonation, etc. These products function as useful wetting, cleansing, and pentrating agents in bleaching liquors such as those used in the kier boiling of cotton goods. They may be added to the lye liquors used for mercerizing cotton goods. They improve the absorption capability of fibrous materials when such materials are subjected to treatments for finishing, softening, stiffening, coloring, impregnating, waterproofing, and mildew proofing. They may be used alone or in combination with other materials for lustering or delustering fabrics. They may be used as assistants in silk degumming liquors and silk soaking solutions. They can also be used to assist in twist setting in yarn and in processes of stripping colors.

Another important class of uses of these new compositions is as assistants in the preparation and application of dyestuffs. They may be used in the preparation of dyestuffs in readily dispersible form and for the production of inorganic pigments or pigments of azo, basic, acid, vat, and sulfur dyes in a finely divided condition. As penetrants and wetting agents they assist in producing level dyeings in neutral, acid, or alkaline dyeing baths. They facilitate dyeing with developed dyes, the dyeing of animal fibers with vat dyes, the dyeing of cellulose acetate fibers with insoluble dyes, dyeing and printing with aniline black, and the dyeing of leather. In printing pastes they assist in the dispersion of the dye or dye component and facilitate its penetration into the natural or synthetic fiber.

In the leather industry these compositions function as useful wetting agents in soaking, deliming, bating, tanning, and dyeing baths. They are useful in softening and treating baths for hides and skins, particularly in baths used for fat-liquoring leather.

The dispersing and emulsifying powers of these new compositions give rise to many interesting uses. They may be utilized for converting liquid or solid substances normally insoluble in water. such as hydrocarbons, higher alcohols, pitches, and pitchy substances into clear solutions or stable emulsions or dispersions. They are useful in preparing emulsions of wax and wax-like compositions which are used as leather dressings or floor polishes. They may be used to prepare artificial dispersions of crude, vulcanized, or reclaimed rubber. They may be used as emulsifiers in the manufacture of salad oils and cosmetic preparations such as cold creams and lip sticks. They may be employed for preparing emulsions of the water-in-oil type such as emulsions of water in such organic solvents as are used in the dry cleaning industry.

These compositions may also be used alone as contact insecticides and for enhancing the spreading and penetrating power of other parasiticides. They may be employed in agricultural sprays in combination with the ordinary insecticides and fungicides. They are useful for promoting the penetrating power of wood preservatives.

In the paper industry these products may be used as penetrants in the liquors used for cooking rags and pulp, and as assistants in paper softening, filling, and processes to increase absorbency.

These compositions may be employed as detergents in several different relations. They may be used in the washing of fruits and vegetables for spray residue removal. They may be used in combination with metal cleaning compounds in neutral, acid, or alkaline liquors. They may be used for paint, varnish, and lacquer cleaners. They may advantageously be employed as cleansing agents in hard water and where a fatty or oily film resists the ordinary cleansing media. They may be added to soap in acid or hard water baths, since these compositions do not form precipitates so readily in hard and acid waters as soaps and Turkey red oils.

These compositions may be used as aids in various chemical reactions. They may be used to control particle size and shape during precipitation or crystallization of compounds from reaction mixture. They may be used to decrease the particle size of insoluble amine hydrochlorides just before these amines are to be diazotized.

These compositions also have several miscellaneous uses. They may be employed as foam stabilizing agents, especially for use in air-foam fire extinguishing compositions. They may be used as anti-spattering agents for fats such as lard substitutes and butter substitutes. They may be used to stabilize rubber latex. They may also be used as frothing and collecting agents in ore flotation processes, and in other processes such as the recovery of fixed oil from the oil sands. The uses mentioned will suggest many similar ones.

One advantage of this invention is that it yields both detergents and wetting agents, which are quite stable to hard water, from cheap fatty acids and accessible polyhydroxyamines.

As many apparently widely different embodiments of this invention may be made without widely departing from the spirit and scope thereof, it is to be understood that the invention is not limited to the specific embodiments thereof except as defined in the appended claims.

I claim:

1. Boric acid esters of organic compounds which contain an aliphatic radical having a chain of eight or more carbon atoms connected through an acid amide linkage to another aliphatic radical which contains a plurality of hydroxy groups.

2. Boric acid esters of compounds having the general formula:

R—CO—NY—X in which R stands for a saturated or unsaturated aliphatic radical containing a chain of eight or more carbon atoms, Y represents hydrogen or an alkyl group containing not more than five carbon atoms, and X stands for a polyhydroxylated alkyl group containing from three to six carbon atoms.

3. Boric acid esters of compounds having the general formula:

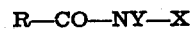

R—CO—NY—X in which R stands for a saturated aliphatic hydrocarbon radical containing a straight chain of from eleven to nineteen carbon atoms, Y represents hydrogen or an alkyl group containing not more than five carbon atoms, and X stands for a polyhydroxylated alkyl group containing from three to six carbon atoms.

4. Boric acid esters of compounds having the general formula:

R—CO—NY—X in which R stands for a saturated or unsaturated aliphatic radical containing a chain of eight or more carbon atoms, Y represents hydrogen or an alkyl group containing not more than five carbon atoms, and X stands for a polyhydroxylated alkyl group containing three or four carbon atoms.

5. Boric acid esters of compounds having the general formula:

R—CO—NY—X in which R stands for a saturated aliphatic hydrocarbon radical containing a straight chain of from eleven to nineteen carbon atoms, Y represents hydrogen or an alkyl group containing not more than five carbon atoms, and X stands for a polyhydroxylated alkyl group containing three or four carbon atoms.

6. Boric acid esters of compounds having the general formula:

R—CO—NY—CH₂CHOHCH₂OH in which R stands for a saturated or unsaturated aliphatic radical containing a chain of eight or more carbon atoms, and Y represents hydrogen, methyl or ethyl.

7. Boric acid esters of compounds having the general formula:

R—CO—NH—CH₂CHOHCH₂OH in which R stands for a saturated aliphatic hydrocarbon radical containing a straight chain of from eleven to nineteen carbon atoms.

8. Boric acid esters of a compound having the general formula:

C₁₇H₃₅—CO—NH—CH₂CHOHCH₂OH

9. A triethanolamine salt of a boric acid ester of a compound having the general formula:

C₁₇H₃₅—CO—NH—CH₂CHOHCH₂OH

10. A process of preparing a new boron-containing organic compound which comprises heating a xylene solution of the amide obtained by heating stearic acid with 1-aminopropanediol-2,3 with boric acid.

11. Boric acid esters of compounds having the general formula:

R—CO—NH—X in which R stands for a saturated or unsaturated aliphatic radical containing a chain of eight or more carbon atoms, and X represents a branched chain polyhydroxylated alkyl group containing four carbon atoms.

12. Boric acid esters of compounds having the general formula:

R—CO—NH—C(CH₂OH)₃ in which R stands for a saturated aliphatic hydrocarbon radical containing a straight chain of from eleven to nineteen carbon atoms.

13. Boric acid esters of compounds having the general formula:

C₁₇H₃₅—CO—NH—C(CH₂OH)₃

14. Boric acid esters of compounds having the general formula:

R—CO—NY—X in which R stands for a saturated or unsaturated aliphatic radical containing a chain of eight or more carbon atoms, Y represents hydrogen or an alkyl group containing not more than five carbon atoms, and X stands for a polyhydroxylated alkyl group which is derived from a sugar and which contains four or five hydroxy groups and five or six carbon atoms.

15. Boric acid esters of compounds having the general formula:

R—CO—NY—X in which R stands for a saturated aliphatic hydrocarbon radical containing a straight chain of from eleven to nineteen carbon atoms, Y represents hydrogen or an alkyl group containing not more than five carbon atoms, and X stands for a polyhydroxylated alkyl group which is derived from a sugar and which contains four or five hydroxy groups and five or six carbon atoms.

16. Boric acid esters of compounds having the general formula:

R—CO—NY—CH₂(CHOH)₄CH₂OH in which R stands for a saturated aliphatic hydrocarbon radical containing a straight chain of from eleven to nineteen carbon atoms, and Y represents hydrogen or methyl.

17. Boric acid esters of compounds having the general formula:

C₁₇H₃₅CO—NY—CH₂(CHOH)₄CH₂OH in which Y represents hydrogen or methyl.

18. Boric acid esters of compounds having the general formula:

C₁₇H₃₅—CO—NY—X in which Y represents hydrogen or an alkyl group containing not more than five carbon atoms, and X stands for a polyhydroxylated alkyl group containing from three to six carbon atoms.

19. Boric acid esters of compounds having the general formula:

R—CO—NY—CH₂CHOHCH₂OH in which R stands for a saturated aliphatic hydrocarbon radical containing a straight chain of from eleven to nineteen carbon atoms, and Y represents hydrogen, methyl, or ethyl.

20. Boric acid esters of compounds having the general formula:

R—CO—NH—X in which R stands for a saturated aliphatic hydrocarbon radical containing a straight chain of from eleven to nineteen carbon atoms and X represents a branched chain polyhydroxylated alkyl group containing four carbon atoms.

HENRY ALFRED PIGGOTT.